Dec. 12, 1961  H. DEUSSNER  3,012,765
ROTARY KILN, PARTICULARLY FOR THE BURNING
OF CEMENT RAW MATERIAL
Filed Nov. 12, 1959  5 Sheets-Sheet 1

INVENTOR

Herbert Deussner

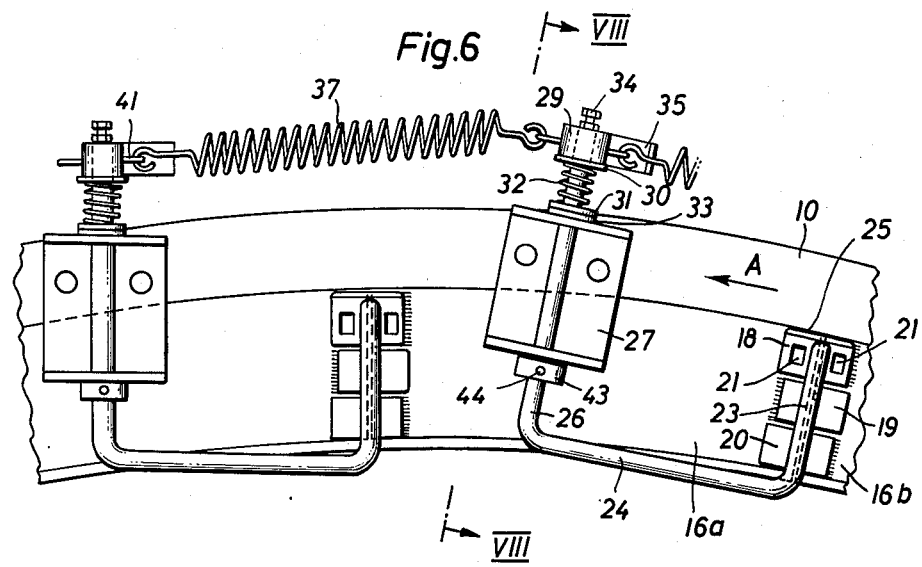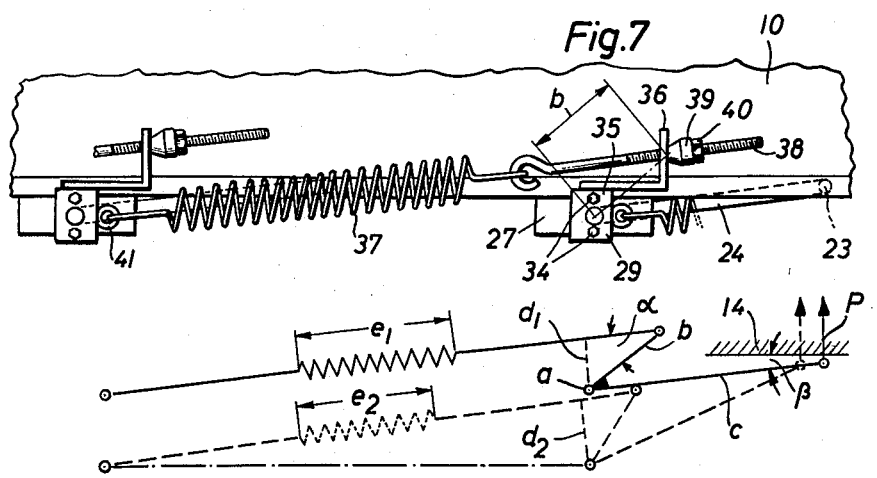

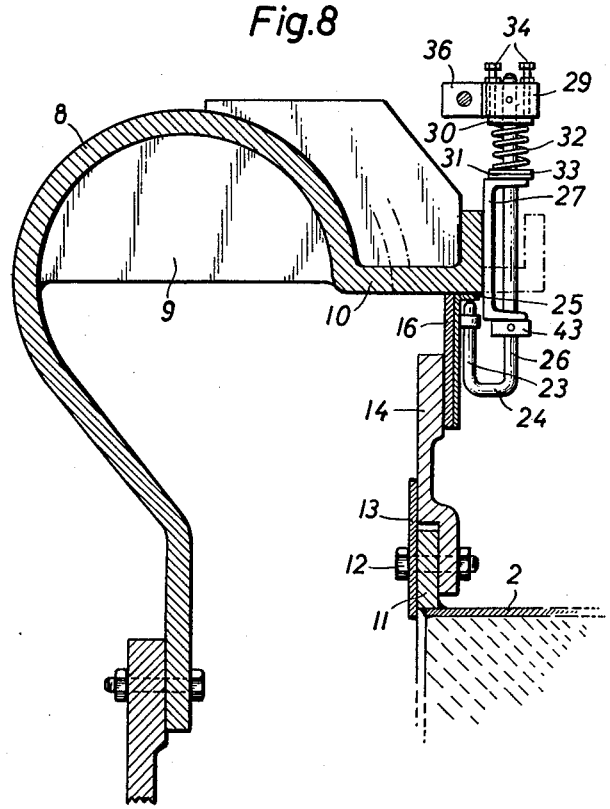

Dec. 12, 1961 H. DEUSSNER 3,012,765
ROTARY KILN, PARTICULARLY FOR THE BURNING
OF CEMENT RAW MATERIAL
Filed Nov. 12, 1959 5 Sheets-Sheet 5

INVENTOR

Herbert Deussner

United States Patent Office 3,012,765
Patented Dec. 12, 1961

1

3,012,765
ROTARY KILN, PARTICULARLY FOR THE BURNING OF CEMENT RAW MATERIAL
Herbert Deussner, Koln-Dellbruck, Germany, assignor to Klockner-Humboldt-Deutz Aktiengesellschaft, Koln-Deutz, Germany, a corporation of Germany
Filed Nov. 12, 1959, Ser. No. 852,304
Claims priority, application Austria Nov. 20, 1958
3 Claims. (Cl. 263—33)

My invention relates to a rotary kiln, particularly for the burning or calcining of cement raw material, and, in a more particular aspect, to a kiln having a stationary flue structure for conducting the kiln exit gases upwardly to heat-exchanging apparatus for preheating the material being fed into the kiln. The flue structure of such a kiln has an inclined rear wall whose lower portion forms a downwardly inclined trough or spout protruding into the kiln proper.

Kilns of this type pose the problem of sealing inevitable interspace between kiln and flue to prevent the escape of dust and the ingress of air, and it is an object of my invention to provide an improved kiln-to-flue seal that secures a reliable sealing action while permitting the kiln to thermally expand or to be moved back and forth in its axial direction for obtaining a uniform wear of the ring structures supporting the kiln.

In accordance with a feature of my invention, a relatively wide ring-shaped gap between kiln and flue structure is surrounded by a hood which is fastened to the kiln jacket and carries on its inner periphery a number of lifting vanes, and the hood is provided with a coaxial hollow-cylindrical structure which forms an extension of the hood and surrounds the flue with radial spacing. Furthermore, a flange is secured to the flue structure so as to terminate some distance from the inner wall of the hollow cylinder, and the flange cooperates with a ring structure located in front of the flange and partially covering the flange. The ring extends to the inner wall of the hollow cylinder and is connected therewith so as to be non-rotatable but axially displaceable relative to the ring, springs under tension being provided for imposing upon the ring a force directed toward the flange.

In a kiln structure according to the invention, the annular gap between kiln and flue need not be made as narrow as heretofore necessary. This gap can rather be given a considerable width in the axial direction of the kiln with the result that the kiln can freely follow any expansion due to heat and can be displaced axially within relatively wide limits. Furthermore, the manufacture and mounting of the kiln is facilitated because relatively large tolerances are permissible. Nevertheless, any dust which may pass through the gap into the hood is entrained by the lifting vanes and is poured off at the top, whence the dust drops upon the trough-shaped portion of the flue structure to slide back into the kiln. The springs always impose sufficient pressure upon the axially displaceable ring structure to keep it in sealing engagement with the flange. Since the ring extends radially into engagement with the inner wall of the hollow cylinder, the kiln and flue remain reliably sealed in any rotary or axial position of the kiln.

According to another, preferred feature of my invention, the ring-shaped sealing structure is composed of a number of circular segments of which each is joined with the hollow cylinder so as to be non-rotatable but axially displaceable relative thereto, and each segment is subjected to the sealing force of a pre-stressed spring. The individual circular segments of the ring structure are then always in particularly good contact with the flange so that the desired sealing action is secured even if the flange

2 warps or otherwise becomes deformed, for example by thermal stresses.

According to another preferred feature of the invention, each ring segment is additionally connected with the hollow cylinder by a pre-stressed spring which exerts upon the segment a radially and outwardly directed force. This causes the individual segments to have their periphery pressed against the inner wall of the hollow cylinder. Consequently a good seal remains secured at these locations if the hollow cylinder is not strictly circular or strictly concentric about the axis of kiln rotation. This affords the further advantage that relatively large tolerances in radial direction become permissible with respect to the manufacture and mounting of the hollow cylinder.

The foregoing and other objects, advantages and features of my invention, said features being set forth with particularity in the claims annexed hereto, will be apparent from, and will be mentioned in, the following in conjunction with the embodiment of a kiln according to the invention illustrated on the drawings, in which:

FIG. 6 illustrates by an axial view a detail of the ring structure on larger scale.

FIG. 7 is a linearly developed plan view corresponding to FIG. 6.

FIG. 8 is a cross section along the line VIII—VIII in FIG. 6; and

FIG. 9 is explanatory and schematically illustrates a lever device which forms part of the ring assembly.

Figure 1:
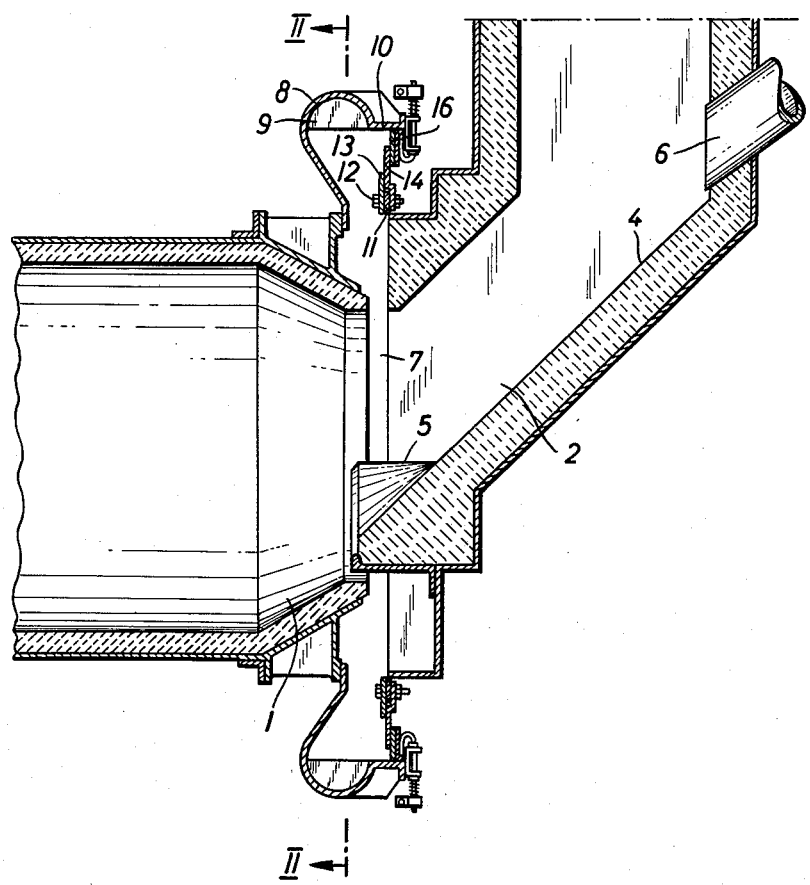
FIG. 1 is a vertical section of the feed end of a rotary kiln.
Figure 2:
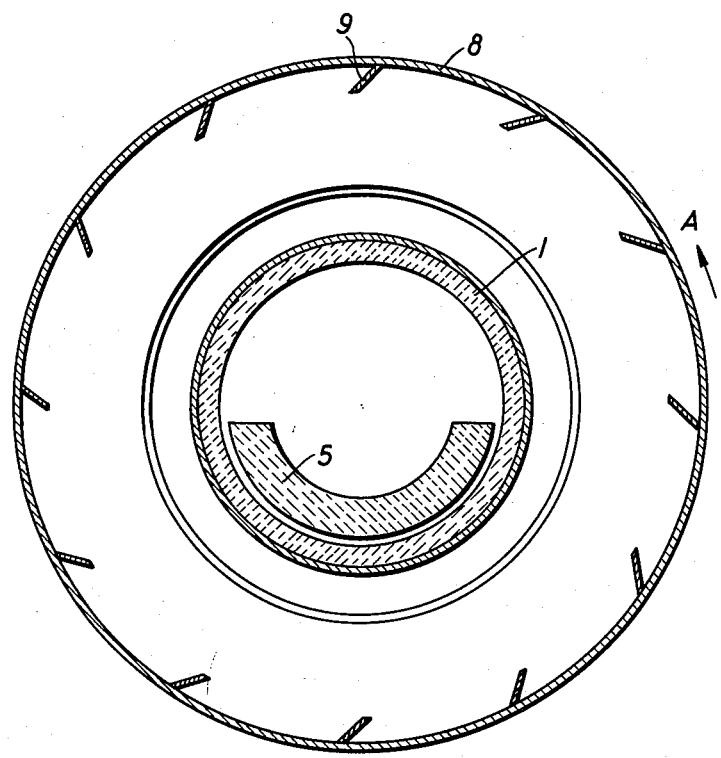
FIG. 2 is a cross section along the line II—II in FIG. 1.

The upper, conical end (feed end) of a rotary kiln 1, used for example for the production of cement and rotating in the direction of the arrow A (FIG. 2), is connected through a stationary exit-gas flue structure 2 with a heat exchanging device (not illustrated) for preheating the cement raw material. The flue structure has an upwardly-inclined rear wall 4 with a spout-shaped lower portion 5 protruding somewhat into the kiln 1 (FIG. 1). The raw material is supplied through a feed pipe 6 onto the inclined rear wall 4 from which it flows through the spout portion 5 into the kiln. A gap 7 is left open between the kiln 1 and the flue structure. The gap width is made so wide that the kiln can be moved axially forward and back within relatively wide limits. For example, in the left end position of the kiln the gap may be about 150 mm. wide. The gap is surrounded by a hood 8 consisting, for example, of heat-resistant cast steel. It possesses in its interior a number of lifting buckets or vanes 9 (FIGS. 1, 2) and has one of its axial sides rigidly secured to the sheet-metal jacket of the kiln 1. On the opposite side, the hood is extended to form a hollow cylindrical portion 10 which surrounds the open end of the flue structure and is radially spaced therefrom.

At the same end, the flue structure is provided with an annular shoulder member 11 to which a flange 14 is firmly secured by means of uniformly distributed screw bolts 12 and a ring-shaped clamping plate 13. The flange 14 extends toward the hollow cylinder 10 but is radially spaced therefrom. The clamping plate 13 and the bolts 12 consist preferably of heat-resistant steel, and the flange 14 of a heat-resistant and wear-resistant steel casting. Located in front of the flange is a ring-shaped structure composed of several circular segments 16. The segments preferably consist of heat-resistant and wear-resistant steel. The individual segmental ring pieces 16, as more fully described below, are connected with the hollow cylinder 10 so as to be non-rotatable relative thereto. Consequently the ring segments 16 rotate together with the kiln 1.

A gap 17 between each two ring pieces 16 (FIG. 3) is covered by three lugs 18, 19, 20 which extend at a right angle to the gap and are located beside each other with slight intermediate clearance.

Figure 3:
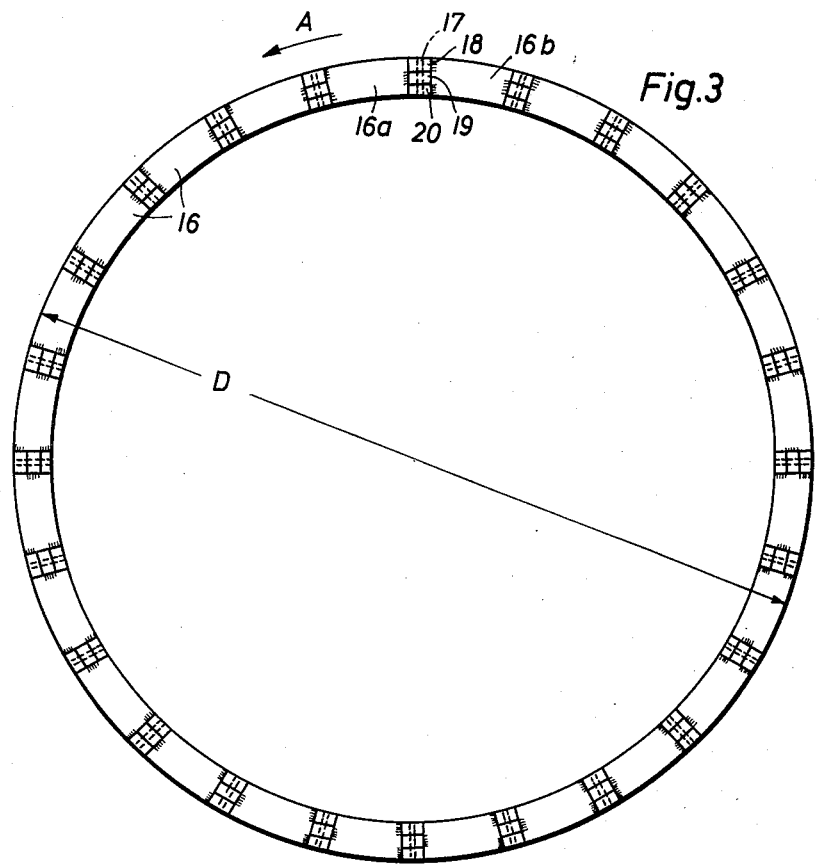
FIG. 3 is an axial view of a ring-shaped sealing member composed of a number of segments.
Figure 4:
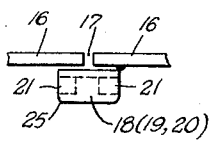
FIG. 4 is a partial side view of the same ring structure.
Figure 5:
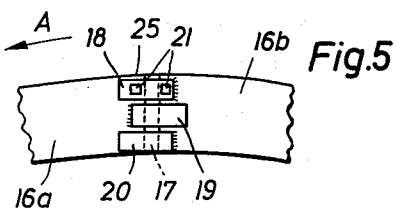
FIG. 5 is a partial view of the ring structure in pulled-apart condition of the segments.

As apparent from FIG. 3, the middle lug 19 at each gap 17 is welded to the ring piece 16a which is leading with respect to the rotation of the kiln, whereas the outer and inner lugs 18 and 20 are welded to the trailing ring piece 16b. The three lugs form an articulate joint between the adjacent ring pieces and permit the two ring pieces to be spread apart so that the outer diameter D of the entire ring assembly can be enlarged, as is apparent from FIG. 5.

Fastened to each outer lug 18 are two bridges 21 in spaced relation to each other. The bridges serve for guiding a leg 23 of a U-shaped lever 24 (FIG. 6). The leg 23 extends radially and outwardly. The outer rim of lug 18 is bent to a rectangular shape and forms a projection 25 abutted by the front face of leg 23. The other leg 26 of the U-shaped lever 24 passes through respective bores in the flanges of a U-shaped steel member 27 which is fastened, preferably in the middle of the leading ring piece 16a, to the hollow cylinder and forms a bearing in which the leg 26 is rotatable as well as axially displaceable.

Mounted on the free end of leg 26 is a rectangular plate 29 (FIG. 8). Two metal washers 30 and 31 as well as a pressure spring 32 are disposed between the plate 29 and the U-member 27. It is further preferable to provide a ring-shaped heat-insulating disc 33 of asbestos between the washer 31 and the U-member for protecting the spring from excessive heating by heat conductance from the U-member. Each plate 29 is preferably traversed by two bolts 34. Tightening of the bolts permits compressing and thus pre-stressing the spring. The force thus exerted by the spring upon the lever 24 is transmitted by the leg 23 radially outward to the ring piece 16. In this manner, the individual ring pieces are spread apart so that their outer periphery is forced against the inner wall of the hollow cylinder 10.

It is preferable to tension the springs only to the extent needed to make the ring pieces just contact the inner wall of the cylinder 10 when the lever 24 with the two appertaining ring pieces 16a and 16b has reached the highest point during rotation of the kiln. Then, the weight of the two ring pieces and of the lever with all parts attached thereto is just counterbalanced by the spring 32. This prevents the occurrence of excessive counter pressure between the ring pieces and the inner wall of the hollow cylinder, which may impede the axial displacement of the hollow cylinder relative to the ring pieces. To also avoid such excessive counter pressure when the lever with the two appertaining ring pieces has reached the lowest point of kiln rotation where the weights and the spring force are additive and would act together in the direction toward the inner wall of the hollow cylinder, a stop ring 43 with a set screw 44 is secured to the leg 26 (FIG. 6). When the ring pieces are being adjusted, the set screw 44 is loosened. When the ring pieces, during tightening of the bolts 34 just enter into contact with the inner wall of the hollow cylinder, the stop ring 43 is pushed against the U-member 27 and is secured in position on leg 26 by tightening the set screw 44. The stop member 43 then serves as an abutment for the lever and limits its freedom of motion in the radially outward direction.

In the event the lever becomes deformed by thermal stresses, the spring 32 also prevents the leg 23 from displacing the appertaining ring pieces outwardly and clamping them so tightly against the inner wall of the hollow cylinder as to impede axial motion of the hollow cylinder relative to the ring pieces. In the event of such deformation of the lever, the spring 32 permits the leg 26 to move radially inward. If lever 24 becomes deformed in the opposite direction, which might cause lifting of the ring pieces from the inner wall of the hollow cylinder, the original, desired condition can readily be re-established after loosening the stop ring 43 and tensioning of spring 32 by means of the bolt 34. Thereafter, the stop ring, as already described, is pushed against the U-member 27 and again fastened by means of the set screw 44.

An angle piece 35 is welded to each plate 29 and forms an arm 36 pointing toward the kiln. A pull spring 37 is disposed on the one side of each arm 36 that is located opposite the lever 24. The spring 37 engages the arm 36 on the one hand and is connected with the hollow cylinder 10 on the other hand. To permit removing the spring, each plate has its rear side provided with an eye 41 into which the pull spring is hung. In lieu of such indirect connection of the pull spring with the hollow cylinder, by means of plate 29 and lever 24, a corresponding fastening eye for the pull spring may also be provided directly on the hollow cylinder.

A pull rod 38 serves to connect the pull spring with the arm 36. The rod 38 passes through a bore of arm 36 and has a screw thread on its free end. Seated on the threaded portion are a semi-spherical abutment 39 and a nut 40. The pull spring is tensioned by tightening the nut 40. This exerts upon the lever 24 a torque in the sense required to make the leg 23 impose upon the appertaining ring pieces a force directed toward the flange 14.

All ring pieces are pressed against the flange in this manner. As a result, and as best apparent from FIG. 1, the hollow cylinder is sealed toward the outside. The seal prevents the escape of dust between kiln and flue structure and also prevents the ingress of undesired air.

During operation, each lever 24 has its leg 23 abut against the leading bridge 21 of a lug 18. This connects the ring pieces non-rotatably with the hollow cylinder so that the ring pieces glide on the stationary flange during rotation of the kiln.

FIG. 8 illustrates the position of the hollow cylinder in the left end position of the kiln. Also shown by dot-and-dash lines is the position of the hollow cylinder in the right end position of the kiln. During forward and return displacement of the kiln in the axial direction, the flange 14 and the ring pieces 16 remain in the illustrated position. When the kiln moves toward the right, the hollow cylinder becomes displaced relative to the flange and the ring pieces in the same direction. Conversely, the cylinder is displaced toward the left relative to the flange and the ring pieces when the kiln passes from the right to the left end position. The leg 26 of each lever 24 participates in these displacements of the cylinder. The other leg 23 of each lever remains in the illustrated position under the effect of the torque imposed upon the lever by the pull spring 37. Consequently, during forward and return motion of the kiln each lever 24 performs pivotal movements about the pivot axis determined by the bearing 27.

The tension of the springs 37 is made high enough to have the ring pieces 16 pressed by legs 23 against the flange in each position of the kiln. In the schematic diagram according to FIG. 9, the pivot point of the lever 24 is denoted by $a$, whereas $b$ denotes the distance between $a$ and the point of attack of pull spring 37 at arm 36 (see FIG. 7), and $c$ denotes the active length of the lever 24. The full lines in FIG. 9 indicate the conditions in the left limit position of the kiln, and the broken lines the condition in the right limit position. As is apparent, the lever arm $d_1$ of the force imposed by pull spring 37 in the left position upon the arm 36, is smaller than the lever arm $d_2$ in the right end position. Conversely, the active spring length $e_1$ is larger than length $e_2$. Consequently, the pull spring exerts greater force in the left limit position than in the right position. During axial displacement of the kiln from the left toward the right, there occurs a decrease in spring force conjointly with an increase in leverage. By corresponding dimensioning of $b$ and $c$, as well as the angles $\alpha$ and $\beta$ in the left limit position of the kiln, care can be taken, as in the case with the conditions represented by the diagram of FIG. 9, that in each position of the kiln the force P, which presses the ring pieces perpendicularly against the stationary flange 14, is approximately the same. For keeping the wear of the flange and of the ring pieces gliding thereon as small as possible, the spring force and hence the force P are made just large enough to keep the ring pieces in good area contact with the flange.

As is apparent from FIGS. 1 and 8, the ring pieces can also move radially toward the flange 14 and thus can follow the hollow cylinder if the feed end of the kiln runs eccentrically, for example due to bending of the kiln jacket. Hence a good seal remains secured even in the event of such a disturbance.

Due to the articulate connection of the individual ring pieces by means of the lugs 18, 19 and 20, the ring pieces can follow any surface irregularities of the flange. Consequently, they rest snugly against the flange even if the flange becomes deformed due to thermal stresses, for example, to a somewhat wavy shape.

Since the individual ring pieces can be pulled or spread apart to a greater or lesser extent, they can always be adjusted to maintain good contact with the hollow cylinder even if the hollow cylinder is not strictly circular.

It will be understood by those skilled in the art upon a study of this disclosure, that my invention permits of various modifications with respect to design details, and hence may be given embodiments other than particularly illustrated and described herein, without departing from the essence of my invention and within the scope of the claims annexed hereto.

I claim:
1. A kiln for processing granular material such as cement, comprising a rotary kiln structure having a feed end, a stationary flue structure adjacent to said feed end and extending upwardly away therefrom, said flue structure having an inner rear surface inclined downwardly toward said kiln structure and forming a spout-shaped bottom portion protruding into said feed end, said kiln and flue structures forming between each other an annular gap of sufficient width to permit axial displacement of said feed end, an annular hood firmly secured to said kiln structure and surrounding said gap, a peripheral group of lifting vanes mounted in said hood, said hood having a hollow cylinder surrounding the kiln-adjacent end of said flue structure and radially spaced therefrom, a flange having a planar surface and fastened to said end of said flue structure and having its outer periphery radially spaced from the inner surface of said cylinder, a ring-shaped member comprising a plurality of segmental pieces having planar inner surfaces radially overlapping at least a portion of said planar surface of said flange and extending outwardly to said inner surface of said cylinder, and joining means connecting said segmental pieces individually with said cylinder in non-rotatable but axially displaceable relation and radially displaceable relation thereto, said joining means comprising lever means pivotally connected to said hollow cylinder, and spring means operably connected to said lever means for urging a portion of said lever means against said ring member so as to press said ring member into sealing glide contact with said flange.

2. A rotary kiln according to claim 1, said joining means comprising additional spring means operably connected to said lever means for urging respective segmental pieces radially outward relative to said respective pieces and toward said hollow cylinder.

3. In a rotary kiln according to claim 1, each two adjacent ones of said ring pieces forming a radial gap between each other, three radially sequential lugs covering said radial gap, the middle one of said lugs being rigidly joined with the leading ring piece relative to the direction of kiln rotation, the other two lugs being rigidly joined with the other ring piece, whereby articulate motion of said ring pieces relative to each other is afforded, a pivot bearing for each of said radial gaps, each bearing being mounted on said cylinder near the middle of said leading ring piece, said lever means comprising a substantially U-shaped lever having two legs of which one is rotatably and axially displaceable in said pivot bearing relative to said cylinder, the outwardly located one of said three lugs being in guiding engagement with said other leg of said lever and having a projection which forms a stop abuttable by said other leg to limit pivotal motion of said lever, a shoulder ring displaceably fastened on said one leg on one side of said pivot bearing, said one leg having a portion protruding from the other side of said pivot bearing and having an arm firmly joined with said protruding portion and directed toward said kiln structure, said joining means comprising a compression spring connected to said arm to urge said arm away from said bearing, said spring means comprising a tension spring operatively linked between said arm and said lever means.

References Cited in the file of this patent

UNITED STATES PATENTS

| 2,469,078 | Robison | May 3, 1949 |

FOREIGN PATENTS

| 555,372 | Canada | Apr. 1, 1958 |
| 595,424 | France | Oct. 2, 1925 |
| 184,798 | Germany | May 14, 1907 |
| 555,795 | Germany | July 28, 1932 |